United States Patent
Ando

(10) Patent No.: US 10,291,794 B2
(45) Date of Patent: May 14, 2019

(54) IMPLEMENTATION OF DISTRIBUTED PROCESSING USING DEVICE, INFORMATION PROCESSING APPARATUS, INFORMATION PROCESSING SYSTEM, AND INFORMATION PROCESSING METHOD TO REDUCE NETWORK LAG

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/695,647

(22) Filed: Sep. 5, 2017

(65) Prior Publication Data

US 2018/0084121 A1    Mar. 22, 2018

(30) Foreign Application Priority Data

Sep. 16, 2016 (JP) .................. 2016-181877

(51) Int. Cl.
*H04N 1/00* (2006.01)
*G06F 3/0484* (2013.01)
*G06F 9/54* (2006.01)

(52) U.S. Cl.
CPC ..... *H04N 1/00244* (2013.01); *G06F 3/04847* (2013.01); *H04N 1/00474* (2013.01); *H04N 1/00938* (2013.01); *G06F 9/54* (2013.01); *H04N 2201/0094* (2013.01)

(58) Field of Classification Search
None
See application file for complete search history.

(56) References Cited

U.S. PATENT DOCUMENTS

| | | |
|---|---|---|
| 7,554,685 B2 | 6/2009 | Akiyoshi et al. |
| 7,636,172 B2 | 12/2009 | Akiyoshi et al. |
| 7,812,978 B2 | 10/2010 | Ando et al. |
| 8,305,591 B2 | 11/2012 | Akiyoshi et al. |
| 8,522,229 B2 | 8/2013 | Ando et al. |
| 8,605,298 B2 | 12/2013 | Ando et al. |
| 8,752,041 B2 | 6/2014 | Akiyoshi et al. |
| 8,819,665 B2 | 8/2014 | Ando et al. |
| 8,988,693 B2 | 3/2015 | Ando |
| 9,003,394 B2 | 4/2015 | Ando |
| 9,019,516 B2 | 4/2015 | Akiyoshi et al. |
| 9,124,733 B2 | 9/2015 | Ando |

(Continued)

FOREIGN PATENT DOCUMENTS

JP       2016-055562      4/2016

OTHER PUBLICATIONS

U.S. Appl. No. 15/454,178, filed Mar. 9, 2017.

*Primary Examiner* — Lennin R Rodriguezgonzalez
(74) *Attorney, Agent, or Firm* — IPUSA, PLLC

(57) ABSTRACT

A device is provided that includes a memory storing a program and a processor configured to execute the program to implement processes of generating second image data that has a reduced amount of data as compared with first image data on which a process is to be executed, transmitting the generated second image data to an information processing apparatus that is connected to the device via a network, receiving a determination result indicating whether the second image data satisfies a predetermined condition from the information processing apparatus, and outputting information based on the received determination result.

12 Claims, 9 Drawing Sheets

(56) References Cited

U.S. PATENT DOCUMENTS

| | | |
|---|---|---|
| 9,135,468 B2 | 9/2015 | Ando |
| 9,141,374 B2 | 9/2015 | Ando |
| 9,164,865 B2 | 10/2015 | Ando et al. |
| 9,167,113 B2 | 10/2015 | Akiyoshi et al. |
| 9,235,453 B2 | 1/2016 | Ando |
| 9,374,490 B2 | 6/2016 | Ando |
| 9,521,274 B2 | 12/2016 | Ando |
| 9,544,473 B2 | 1/2017 | Namihira et al. |
| 2009/0316170 A1* | 12/2009 | Tsujii .................... G03G 15/50 358/1.9 |
| 2013/0019160 A1* | 1/2013 | Bando ................ H04N 1/00244 715/234 |
| 2015/0186188 A1 | 7/2015 | Ando |
| 2016/0342577 A1 | 11/2016 | Ando |
| 2016/0344881 A1 | 11/2016 | Ando |
| 2017/0102865 A1 | 4/2017 | Ando |

* cited by examiner

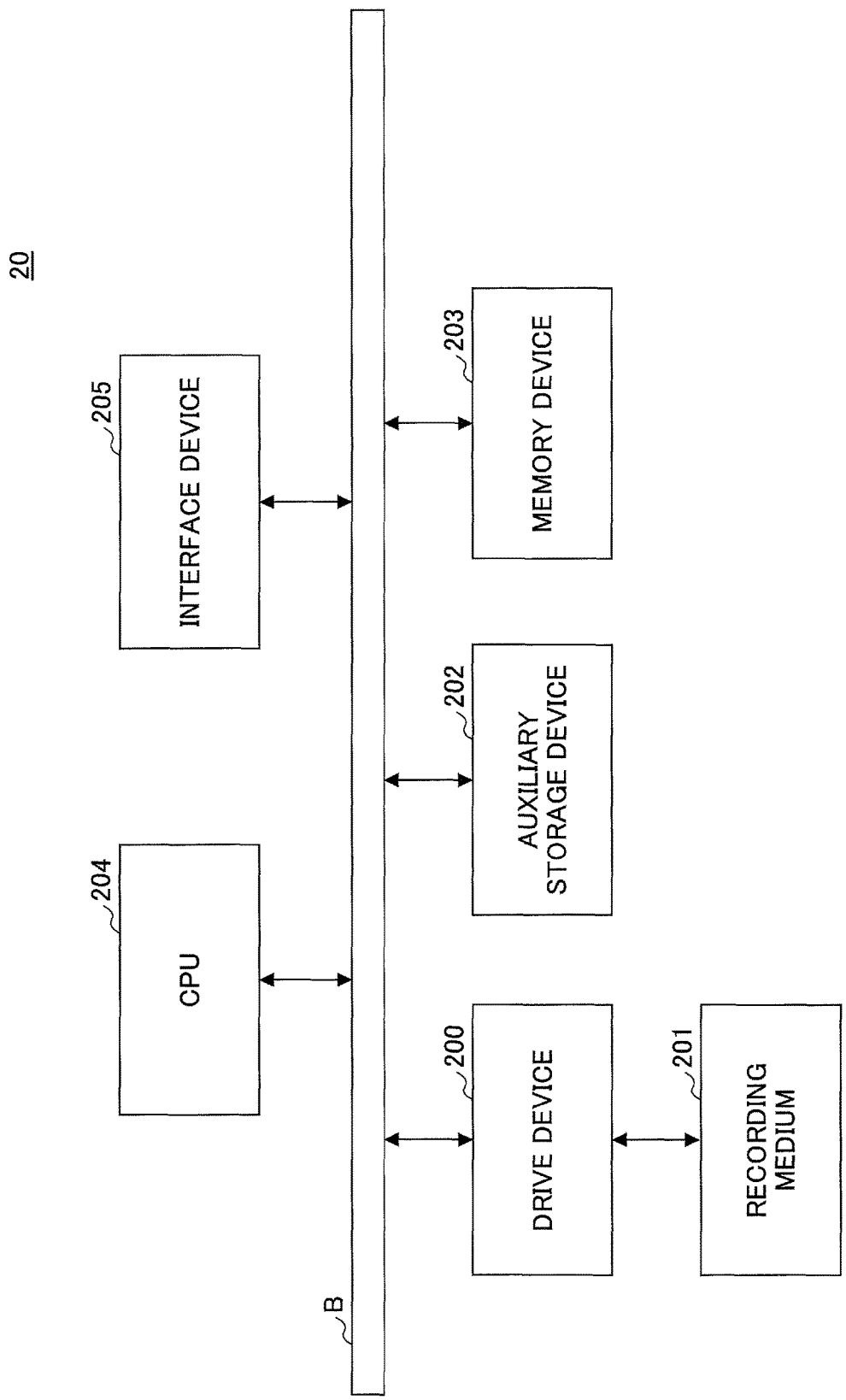

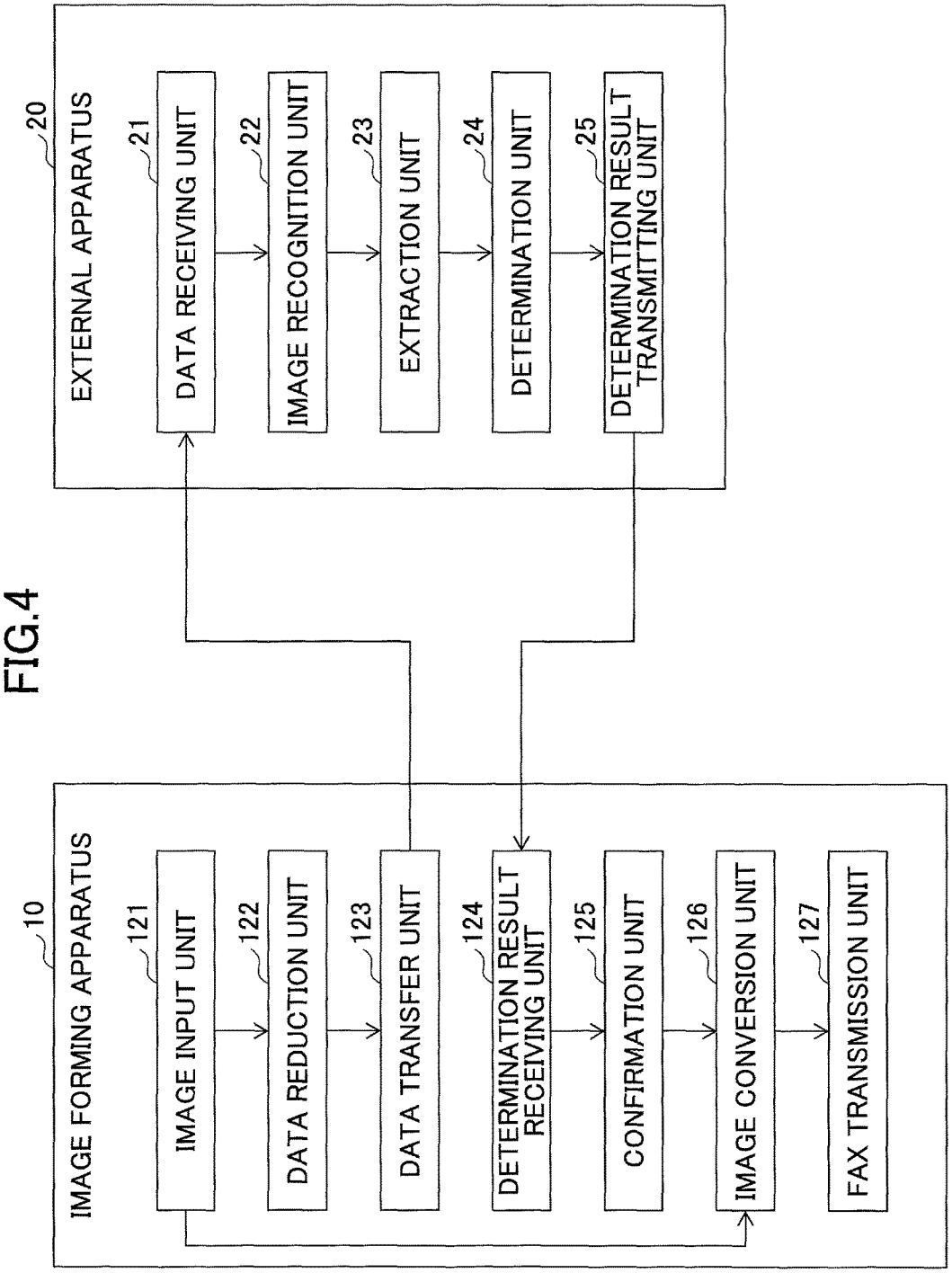

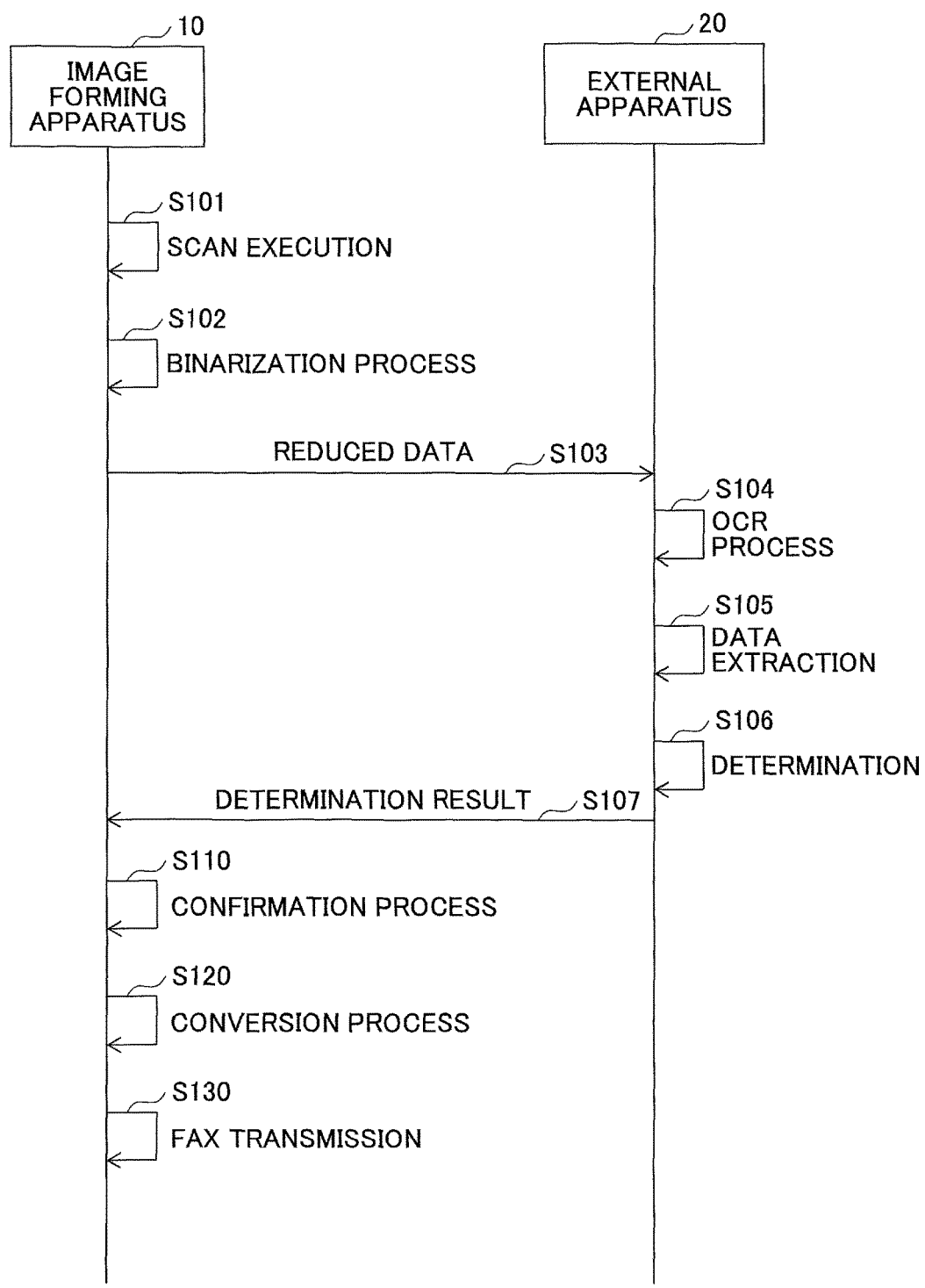

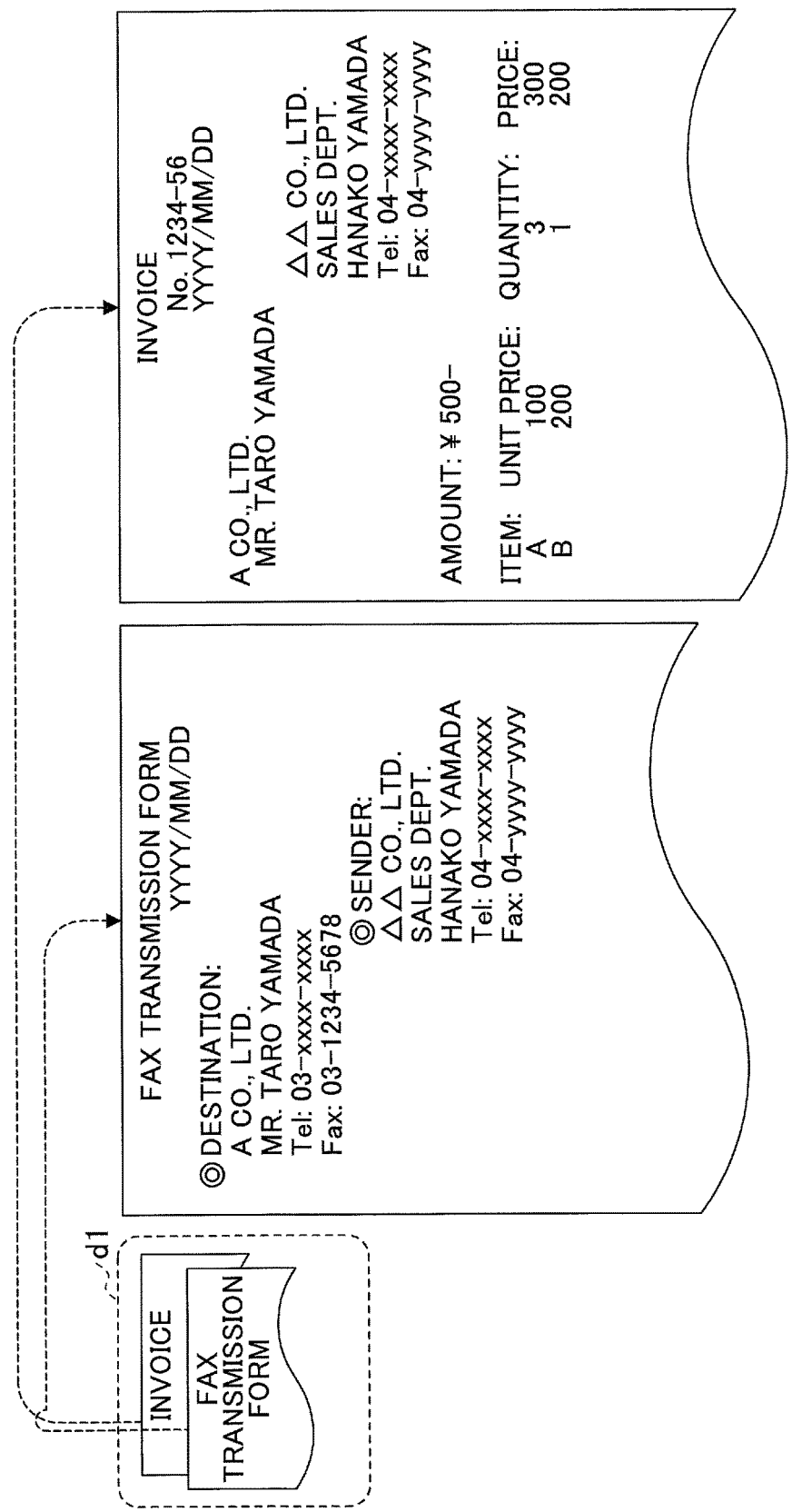

FIG.7

| NAME | FAX NUMBER | COMPANY NAME |
|---|---|---|
| TARO YAMADA | 03-1234-5678 | A CO., LTD. |
| : | : | : |

FIG.8

| CLASSIFICATION 1 | CLASSIFICATION 2 | VALUE |
|---|---|---|
| DOCUMENT CLASSIFICATION | | FAX TRANSMISSION FORM |
| DESTINATION INFORMATION | COMPANY NAME | A CO., LTD. |
| | DEPARTMENT | |
| | NAME | TARO YAMADA |
| | PHONE NUMBER | 03-xxxx-xxxx |
| | FAX NUMBER | 03-1234-5678 |
| SENDER INFORMATION | COMPANY NAME | △△ CO., LTD. |
| | DEPARTMENT | SALES DEPT. |
| | NAME | HANAKO YAMADA |
| | PHONE NUMBER | 04-xxxx-xxxx |
| | FAX NUMBER | 04-yyyy-yyyy |
| OTHER INFORMATION | DATE | YYYY/MM/DD |

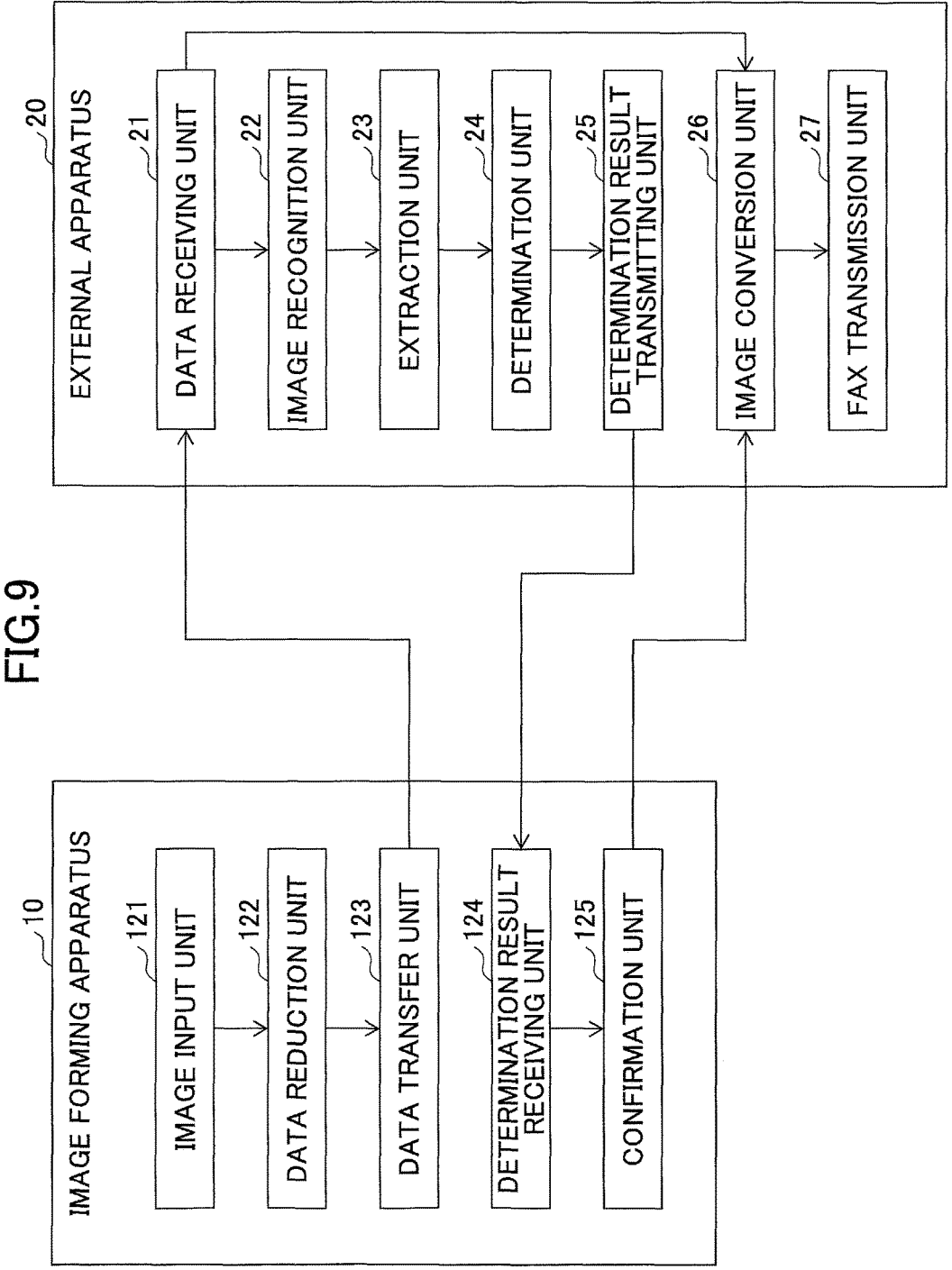

IMPLEMENTATION OF DISTRIBUTED PROCESSING USING DEVICE, INFORMATION PROCESSING APPARATUS, INFORMATION PROCESSING SYSTEM, AND INFORMATION PROCESSING METHOD TO REDUCE NETWORK LAG

CROSS-REFERENCE TO RELATED APPLICATIONS

The present application claims priority under 35 U.S.C. § 119 to Japanese Patent Application No. 2016-181877 filed on Sep. 16, 2016, the entire contents of which are incorporated herein by reference.

BACKGROUND OF THE INVENTION

1. Field of the Invention

The present invention relates to a device, an information processing apparatus, an information processing system, and an information processing method.

2. Description of the Related Art

Typically, a user is presumed to have an understanding of the device he/she is using. Henceforth, a device may potentially be able to understand the user, understand the context of the user, and provide an appealing user interface to the user based on the understanding of the user and the context, for example. In this way, the intelligence of the device may be noticed by the user, for example.

In order to make the user become aware of the intelligence of a device, it is important for the device to be able to make an "immediate and intelligent response". For example, an "immediate and intelligent response" may include avoiding a situation where a user using the device is kept waiting (or where user operability is otherwise degraded), or implementing functions for improving user operability or convenience, such as enabling bidirectionality, for example. Although the intelligence of a device is not limited to its ability to make an "immediate and intelligent response", by having the device make an "immediate and intelligent response" with respect to a user operation, the user may notice the intelligence of the device, and the device may be regarded as providing an appealing user interface to the user.

SUMMARY OF THE INVENTION

According to one embodiment of the present invention, a device is provided that includes a memory storing a program and a processor configured to execute the program to implement processes of generating second image data that has a reduced amount of data as compared with first image data on which a process is to be executed, transmitting the generated second image data to an information processing apparatus that is connected to the device via a network, receiving a determination result indicating whether the second image data satisfies a predetermined condition from the information processing apparatus, and outputting information based on the received determination result.

BRIEF DESCRIPTION OF THE DRAWINGS

FIG. 3 is a diagram illustrating an example hardware configuration of an external apparatus according to the first embodiment;

FIG. 4 is a diagram illustrating example functional configurations of the image forming apparatus and the external apparatus according to the first embodiment;

FIG. 5 is a sequence chart illustrating an example processing procedure executed by the information processing system according to the first embodiment;

FIG. 6 is a diagram illustrating an example of a paper document to be transmitted by fax transmission;

FIG. 7 is a table illustrating an example configuration of an address book;

FIG. 8 is a table illustrating an example of structured data;

FIG. 9 is a diagram illustrating example functional configurations of the image forming apparatus and the external apparatus according to a second embodiment of the present invention.

DESCRIPTION OF THE EMBODIMENTS

To enable a device to implement a process that can be considered an "immediate and intelligent response" with respect to a user operation as described above, computing capacity and storage capacity exceeding the capacity of the device are required. As such, distributed processing by the device and an external system has to be implemented.

Generally, when comparing the image processing capacity of a device that inputs an image and the image processing capacity of an information processing system, such as a cloud system, the latter is substantially higher than the former. However, communication delay between the device and the information processing system becomes a bottleneck, and a substantial amount of time may be required to transfer an image between the device and the information processing system such that the high-speed image processing capacity of the information processing system may not be effectively used to improve processing efficiency, for example.

An aspect of the present invention is directed to providing a technique for reducing influences of network communication when requesting an external apparatus connected to a device via a network to execute a process.

In the following, embodiments of the present invention are described with reference to the accompanying drawings.

Figure 1:
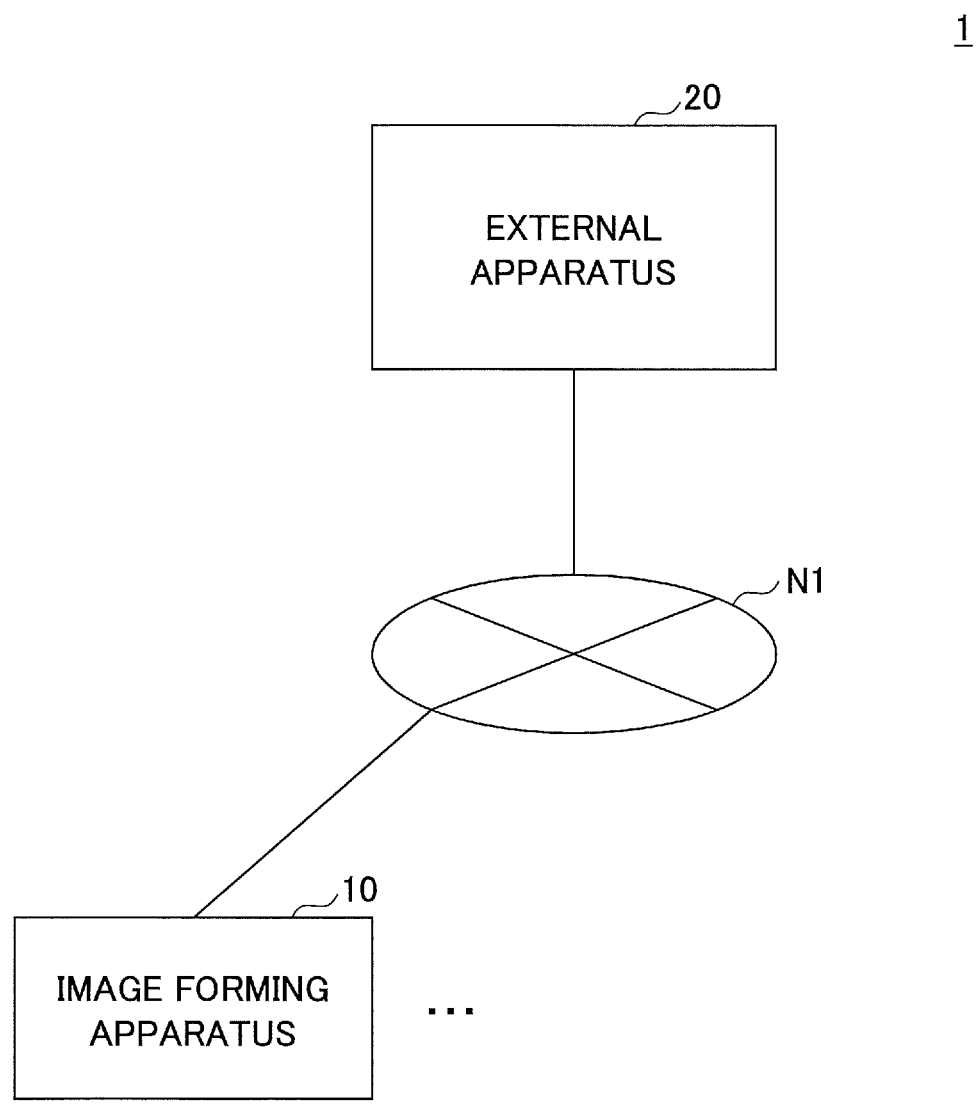
FIG. 1 is a diagram illustrating an example configuration of an information processing system according to a first embodiment of the present invention.

FIG. 1 is a diagram illustrating an example configuration of an information processing system 1 according to a first embodiment of the present invention. In FIG. 1, the information processing system 1 includes an external apparatus 20 that is connected to one or more image forming apparatuses 10 via a network N1. The network N1 may be a LAN (Local Area Network), the Internet, or a USB (Universal Serial Bus) cable, for example.

The image forming apparatus 10 may be a fax (facsimile) machine or a multifunction peripheral (MFP), for example. According to the first embodiment, when the image forming apparatus 10 accepts a fax transmission instruction input by a user, the image forming apparatus 10 inputs image data obtained by scanning a paper document, executes image processing on the input image data, and transmits the image processing result by fax transmission. At this time, the image forming apparatus 10 performs an "immediate and intelligent response" in response to the fax transmission instruction input by the user. In the following, examples of an "immediate and intelligent response" are described.

To perform fax transmission using the image forming apparatus 10, the user sets a paper document on the image forming apparatus 10 and sets up a transmission destination (e.g., fax number). Then, the user presses a "start transmission" button and inputs a fax transmission instruction to the image forming apparatus 10. In response to the fax transmission instruction, the image forming apparatus 10 scans the paper document and generates image data (scanned image). The image forming apparatus 10 then transmits the generated image data (scanned image) by fax transmission. In this process, the image forming apparatus 10 notifies the user whether the fax transmission has been successful after completing the fax transmission. Such a notification after fax transmission may not be considered an immediate response or an intelligent response.

An "immediate and intelligent response" in this process may include promptly understanding and responding to fax transmission information (destination and document content) before fax transmission is executed. That is, promptly implementing assistance measures for reducing erroneous transmission after scanning of the paper document is completed without making the user wait for a substantial amount of time (or minimizing the wait time) may be considered an "immediate and intelligent response", for example.

In the present embodiment, as an example of an "immediate and intelligent response", the image forming apparatus 10 determines whether a fax number indicated as the transmission destination in a fax transmission form matches the fax number set up by the user, and if the fax numbers do not match, the image forming apparatus 10 notifies the user and confirms with the user whether the fax transmission should be executed. That is, a sheet (fax transmission form) describing destination information and sender information is typically attached as the first page of a document to be transmitted by fax transmission, and a fax number corresponding to the transmission destination is included in the destination information. If the fax number included in the destination information and the fax number input by the user do not match, erroneous transmission of confidential documents or the like may be prevented by confirming with the user whether the fax transmission should be executed.

The external apparatus 20 may be a device such as a computer that executes a process in response to a request from the image forming apparatus 10. In a preferred embodiment, the processing capacity of the external apparatus 20 is higher than that of the image forming apparatus 10 that issues the process request. In the present embodiment, the external apparatus 20 executes processes for assisting the image forming apparatus 10 to make an "immediate and intelligent response". Specifically, the external apparatus 20 determines whether the fax number indicated as the transmission destination on the first page of a fax transmission form matches the fax number set up by the user.

Note that the external apparatus 20 may be a computer or a computer system that provides a service in the form of a cloud service, a web service, or an ASP (application service provider), for example. The external apparatus 20 may also be a computer, such as a PC (Personal Computer), or a computer system installed in the same environment (organization) as that where the image forming apparatus 10 is installed, for example.

Figure 2:
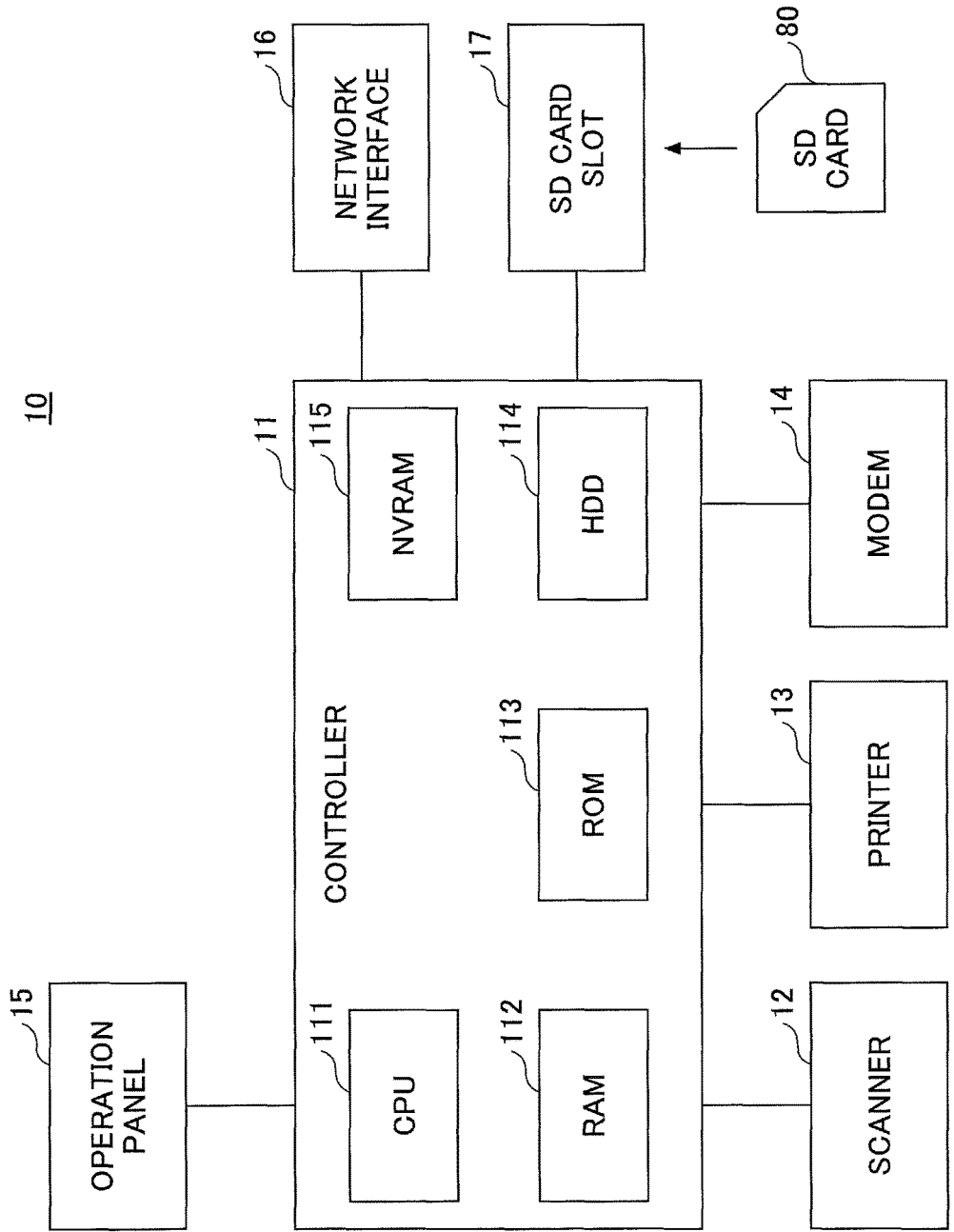
FIG. 2 is a diagram illustrating an example hardware configuration of an image forming apparatus according to the first embodiment.

FIG. 2 is a diagram illustrating an example hardware configuration of the image forming apparatus 10 according to the first embodiment. In FIG. 2, the image forming apparatus 10 includes hardware, such as a controller 11, a scanner 12, a printer 13, a modem 14, an operation panel 15, a network interface 16, and an SD card slot 17.

The controller 11 includes a CPU 111, a RAM 112, a ROM 113, an HDD 114, and an NVRAM 115. The ROM 113 stores various programs and data used by the various programs, for example. The RAM 112 may be used as a storage area for loading a program and a work area for executing the loaded program, for example. The CPU 111 implements various functions by executing processes based on a program loaded in the RAM 112. The HDD 114 stores programs and various types of data used by the programs. The NVRAM 115 stores various types of setting information, for example.

The scanner 12 is hardware (image scanning unit) for scanning a paper document and obtaining image data of the paper document. The printer 13 is hardware (printing unit) for printing print data on a printing medium, such as paper. The modem 14 is hardware for establishing connection with a telephone line, and is used for transmitting and receiving image data through facsimile communication. The operation panel 15 is hardware including an input unit, such as a button for accepting an input from a user, and a display unit, such as a liquid crystal panel, for example. In some embodiments, the liquid crystal panel may include a touch panel function. In this case, the liquid crystal panel also functions as an input unit. The network interface 16 is hardware for establishing connection with a network, such as a LAN (wired or wireless). The SD card slot 17 is used for reading a program stored in an SD card 80. That is, in the image forming apparatus 10, not only a program stored in the ROM 113 but also a program stored in the SD card 80 can be loaded into the RAM 112 and executed. Note that the SD card 80 may be replaced by some other type of recording medium (e.g., a CD-ROM or a USB (Universal Serial Bus) memory). That is, the recording medium to be used in place of the SD card 80 is not limited to a specific type of recording medium. In this case, the SD card slot 17 may be replaced by hardware corresponding to the type of recording medium used.

FIG. 3 is a diagram illustrating an example hardware configuration of the external apparatus 20 according to the first embodiment. In FIG. 3, the external apparatus 20 includes a drive device 200, an auxiliary storage device 202, a memory device 203, a CPU 204, and an interface device 205 that are connected to each other via a bus B.

A program for implementing a process in the external apparatus 20 may be provided by a recording medium 201, such as a CD-ROM, for example. When the recording medium 201 storing the program is loaded in the drive device 200, the program can be read from the recording medium 201 and installed in the auxiliary storage device 202 via the drive device 200. Note, however, that a program does not necessarily have to be installed from the recording medium 201, but may instead be downloaded from another computer via a network, for example. The auxiliary storage device 202 stores the installed programs and other necessary files and data, for example.

The memory device 203 reads a program from the auxiliary storage device 202 and stores the read program upon receiving an instruction to activate the program. The CPU 204 executes a function of the external apparatus 20 based on the program stored in the memory device 203. The interface device 205 is used as an interface for establishing connection with a network.

Note that in some embodiments, the external apparatus 20 may be configured by a plurality of computers having hardware as illustrated in FIG. 3, for example. That is, processes executed by the external apparatus 20 as described below may be distributed to and executed by a plurality of computers, for example.

FIG. 4 is a diagram illustrating example functional configurations of the image forming apparatus 10 and the external apparatus 20 according to the first embodiment. In FIG. 4, the image forming apparatus 10 includes an image input unit 121, a data reduction unit 122, a data transfer unit 123, a determination result receiving unit 124, a confirmation unit 125, an image conversion unit 126, and a fax transmission unit 127. Each of these functional units may be implemented by the CPU 111 executing a process based on one or more programs installed in the image forming apparatus 10, for example.

The image input unit 121 causes the scanner 12 to scan an image of a paper document and generate image data of the scanned image. That is, the image input unit 121 inputs the scanned image to the image forming apparatus 10. The scanned image may be a color image, for example. The data reduction unit 122 executes a binarization process on image data of the first page of the scanned image that is expected to be a fax transmission form and generates image data (reduced data) of a black and white image of the first page. The data transfer unit 123 transfers (transmits) the fax number set up as the transmission destination by the user (hereinafter referred to as "set fax number") and the reduced data to the external apparatus 20. Note that the reduced data is transmitted to the external apparatus 20 in the present embodiment because the external apparatus 20 needs to process the reduced data to determine whether an "intelligent response" should be made.

The determination result receiving unit 124 receives a determination result from the external apparatus 20 indicating whether a character string matching the set fax number is included in the reduced data. In turn, the confirmation unit 125 outputs information based on the received determination result. For example, when the determination result indicates that a character string matching the set fax number is not included in the reduced data, the confirmation unit 125 outputs information for confirming with the user whether to execute fax transmission.

The image conversion unit 126 converts the scanned image into data in a format suitable for fax transmission (e.g., TIFF format). The fax transmission unit 127 transmits the resulting converted data generated by the image conversion unit 126 to the set fax number. Note, however, that when the scanned image is in a data format suitable for facsimile transmission in the first place, the conversion process by the image conversion unit 126 does not have to be executed.

The external apparatus 20 includes a data receiving unit 21, an image recognition unit 22, an extraction unit 23, a determination unit 24, and a determination result transmitting unit 25. Each of these functional units may be implemented by the CPU 204 executing a process based on one or more programs installed in the external apparatus 20, for example.

The data receiving unit 21 receives the set fax number and the reduced data transmitted from the image forming apparatus 10. The image recognition unit 22 performs an OCR process on the reduced data and generates coordinates-associated text data. Coordinates-associated text data refers to data 2Q associating each character recognized by the OCR process with coordinate values of a rectangle circumscribing the recognized character.

The extraction unit 23 converts the coordinates-associated text data into structured data. Structured data refers to data clarifying the meaning of character strings included in the coordinates-associated text data (the meaning of information items included in the fax transmission form). In the following descriptions, data converted by the extraction unit 23 will be referred to as "structured data".

The determination unit 24 determines whether the structured data satisfies a predetermined condition before facsimile transmission is executed. More specifically, the determination unit 24 determines whether an information item set up with respect to the fax transmission process is in conformity with the structured data. For example, the determination unit 24 determines whether the set fax number is included as a transmission destination fax number in the structured data. The determination result transmitting unit 25 transmits a determination result of the determination made by the determination unit 24 to the image forming apparatus 10.

In the following, a processing procedure executed by the information processing system 1 will be described. FIG. 5 is a sequence chart illustrating an example processing procedure executed by the information processing system 1 according to the first embodiment.

When a user sets a paper document on the image forming apparatus 10, sets up a fax number as a transmission destination (set fax number), and inputs a fax transmission instruction, the image input unit 121 controls the scanner 12 to scan the paper document (step S101). The image input unit 121 then generates image data of the scanned image.

FIG. 6 is a diagram illustrating an example of a paper document d1 to be transmitted by fax transmission. As illustrated in FIG. 6, the paper document d1 includes a fax transmission form as the first page and a document to be transmitted (invoice in the present example) as the second page and any subsequent pages. Note that although FIG. 6 illustrates an example where the invoice is a document of one page, the invoice may include multiple pages.

Note that the set fax number may be input using ten keys or soft keys on the operation panel 15, for example. Alternatively, the set fax number may be selected from an address book that is stored in advance in the image forming apparatus 10, for example.

FIG. 7 is a diagram illustrating an example configuration of an address book. As illustrated in FIG. 7, the address book may include information items, such as a name, a fax number, and a company name, for each transmission destination candidate. When using such an address book, a list of names and company names may be displayed on the operation panel 15, and a fax number associated with the name and company name selected from the displayed list of names and company names may be set up as the set fax number, for example.

Then, the data reduction unit 122 executes a binarization process on image data of the first page of the scanned image to generate reduced data of a black and white image of the first page (step S102). Then, the data transfer unit 123 transmits the reduced data and the set fax number to the external apparatus 20 (step S103). Note that because the reduced data transmitted in step S103 is image data of the first page that has been subjected to a binarization process, the amount of data transmitted is smaller as compared with the case of transmitting the scanned image.

When the reduced data and the set fax number are received by the data receiving unit 21 of the external apparatus 20, the image recognition unit 22 executes an OCR process on the reduced data (step S104). Note that in this process step, a binarization process, which is typically a part of an OCR process, may be omitted. As a result of performing the OCR process, coordinates-associated text data is generated. The coordinates-associated text data includes a group of characters extracted from a character region within the image represented by the reduced data. The coordinates-associated text data also includes coordinate values associated with each of the characters.

Then, the extraction unit 23 converts non-structured coordinates-associated text data into structured data (step S105).

FIG. 8 is a diagram illustrating an example of structured data. In the structured data of FIG. 8, information items included in a fax transmission form are classified by a two-tiered classification scheme including classification 1 and classification 2. Classification 1 classifies information items into relatively broad classification items including "document classification", "destination information", "sender information", and "other information".

The "document classification" indicates a determination result of the corresponding type of document of the coordinates-associated text data. That is, the extraction unit 23 may generate structured data under the presumption that the coordinates-associated text data to be processed is a fax transmission form, or the extraction unit 23 may determine the document classification (document type) of the coordinates-associated text data to be processed and generate structured data based on the coordinates-associated text data upon determining that the document classification (document type) of the coordinates-associated text data is a fax transmission form, for example. In the latter case, a known technique for determining the document classification (document type) may be used. In the former case, the fax transmission form may further be presumed to be in a predetermined layout, for example. That is, the extraction unit 23 may presume that certain types of information are described in certain parts of the fax transmission form, for example.

The "destination information" is information relating to the destination of the fax transmission. The "sender information" is information relating to the sender of the fax transmission. The "other information" is information that does not correspond to the "destination information" or the "sender information".

Classification 2 subdivides the classification items of classification 1 into more detailed classification items. For example, with respect to the "destination information" and the "sender information", classification 2 classifies the information items into "company name", "department", "name", "telephone number", and "fax number". With respect to the "other information", classification 2 classifies the information item as "date".

The structured data includes values extracted from the coordinates-associated text data corresponding to the classification items of classification 2.

Then, the determination unit 24 determines whether the relevant information item in the structured data matches the set fax number received by the data receiving unit 21 (step S106). That is, the determination unit 24 determines whether the fax number included in the destination information of the structured data matches the set fax number received by the data receiving unit 21. Then, the determination result transmitting unit 25 transmits the determination result of the determination unit 24 to the image forming apparatus 10 (step S107). The determination result is received by the determination result receiving unit 124 of the image forming apparatus 10.

When the determination result indicates that the fax number included in the destination information of the structured data does not match the set fax number, the confirmation unit 125 confirms with the user whether to execute fax transmission (step S110). For example, the confirmation unit 125 may control the operation panel 15 to display a confirmation screen including a confirmation message indicating, "The fax number indicated as the destination in the fax transmission form does not match the input/selected fax number. Do you wish to proceed with fax transmission as is?" The confirmation screen may also include an "OK" button for accepting an instruction from the user and a "cancel" button, for example. The "OK" button is a button for accepting a fax transmission instruction, and the "cancel" button is a button for accepting an instruction to cancel fax transmission. When the "cancel" button is pressed, processes from step S120 and onward are not executed. When the "OK" button is pressed, the processes of step S120 and onward are executed. When the received determination result indicates that the fax number included in the destination information of the structured data matches the set fax number, the confirmation process of step S110 is not executed and the processes from step S120 and onward are executed.

In step S120, the image conversion unit 126 converts the scanned image into data in a format suitable for fax transmission, such as the TIFF format. Then, the fax transmission unit 127 transmits the converted data by fax transmission (step S130). Note, however, that in some embodiments, the scanned image may be transmitted as is by fax transmission.

As described above, according to the first embodiment, data transmitted to the external apparatus 20 for executing processes relating to an "immediate and intelligent response" is not the scanned image itself but reduced data obtained by reducing the amount of data of the scanned image. Thus, when requesting process execution by the external apparatus 20 that is connected to the image forming apparatus 10 via a network, influences of network communication may be reduced.

Note that in a case where the fax transmission form may be two pages or more, reduced data may be generated for image data of two or more pages of the scanned image.

In the following, a second embodiment of the present invention will be described. Note that aspects and features of the second embodiment that differ from those of the first embodiment will be described below. Thus, it may be assumed that aspects and features of the second embodiment that are not particularly mentioned below may be substantially identical to those of the first embodiment.

FIG. 9 is a diagram illustrating example functional configurations of the image forming apparatus 10 and the external apparatus 20 according to the second embodiment. In FIG. 9, functional units substantially identical to those illustrated in FIG. 4 are given the same reference numerals and descriptions thereof are omitted.

In FIG. 9, the external apparatus 20 further includes an image conversion unit 26 and a fax transmission unit 27. Each of these functional units may be implemented by the CPU 204 executing a process based on one or more programs installed in the external apparatus 20, for example.

The image conversion unit 26 converts the scanned image into a data format for fax transmission (e.g., TIFF format). The fax transmission unit 27 transmits the resulting converted data generated by the image conversion unit 26 to the set fax number.

That is, in the second embodiment, fax transmission is executed by the external apparatus 20. Thus, the data transfer unit 123 transmits not only the reduced data but also all the pages of the scanned image to the external apparatus 20. In this case, the amount of data transmitted from the image forming apparatus 10 to the external apparatus 20 is increased such that the immediacy of an "immediate and intelligent response" may be compromised. In this respect, the data transfer unit 123 according to the second embodiment prioritizes transmission of the reduced data over transmission of the scanned image in transmitting data to the external apparatus 20 I order to control such impact on immediacy.

Note that in the second embodiment, the image forming apparatus 10 does not have to include the image converting unit 126 and the fax transmission unit 127.

Figure 10:
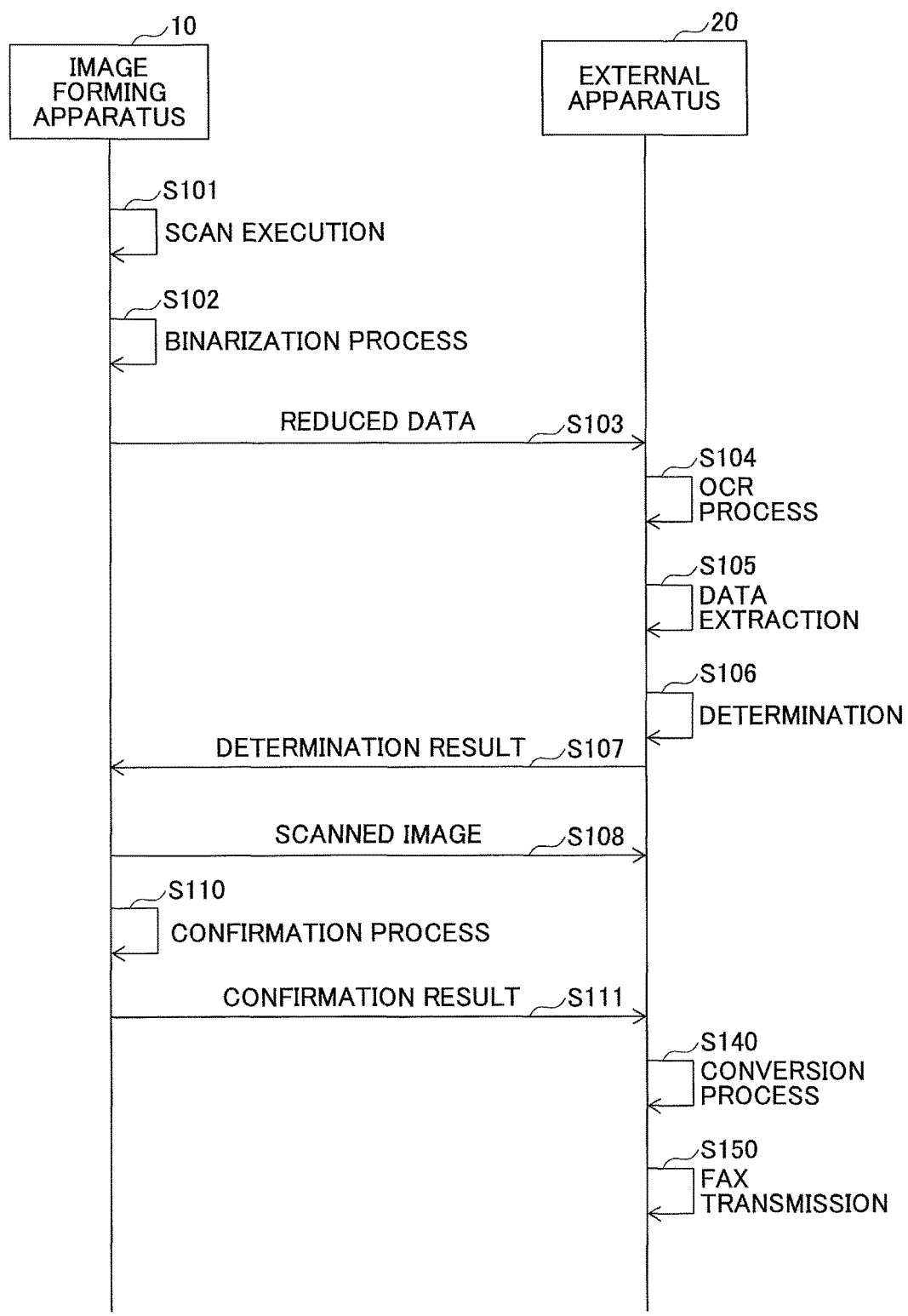
FIG. 10 is a sequence chart illustrating an example processing procedure executed by the information processing system according to the second embodiment.

FIG. 10 is a sequence chart illustrating an example processing procedure executed by the information processing system 1 according to the second embodiment. In FIG. 10, process steps that are substantially identical to those illustrated in FIG. 5 are given the same reference numerals and descriptions thereof are omitted.

In the second embodiment, the timing at which the reduced data is transferred to the external apparatus 20 is the same as that in the first embodiment (step S103). In response to receiving the reduced data from the image forming apparatus 10, the external apparatus 20 executes the processes of steps S104 to S107.

Further, the data transfer unit 123 may transmit the scanned image to the external apparatus 20 while the external apparatus 20 is executing the processes of steps S104 to S107, for example (step S108). In this case, the data receiving unit 21 of the external apparatus 20 receives the scanned image from the image forming apparatus 10 in parallel with the execution of the processes of steps S104 to S107 by the external apparatus 20.

Alternatively, the data transfer unit 123 may transmit the scanned image to the external apparatus 20 while the confirmation unit 125 is executing the confirmation process of step S110 (e.g., while waiting for an input by the user via the confirmation screen).

That is, by temporally shifting the transmission timing of the scanned image and the transmission timing of the reduced data with respect to each other, execution of the processes of steps S104 to S107 may be prevented from being affected (delayed) by the transmission time for transmitting the scanned image such that an adverse impact on the immediacy of an "immediate and intelligent response" may be prevented or controlled.

When the "OK" button or the "cancel" button on the confirmation screen is pressed by the user, the confirmation unit 125 transmits a corresponding confirmation result (information indicating whether fax transmission is to be executed) to the external apparatus 20 (step S111).

Upon receiving the confirmation result, the external apparatus 20 executes the processes from step S140 and onward if the confirmation result indicates that fax transmission is to be executed. On the other hand, if the confirmation result indicates that fax transmission is not to be executed, the external apparatus 20 does not execute the processes of step S140 and onward.

In step S140, the image conversion unit 26 converts the scanned image received by the data receiving unit 21 into data in a format suitable for fax transmission, such as the TIFF format. Then, the fax transmission unit 27 transmits the converted data by fax transmission (step S150). Note that, as in the first embodiment, the scanned image may alternatively be transmitted as is without undergoing the conversion process.

Note that in the above-described example, the transmission timing of the reduced data and the transmission timing of the scanned image are temporally shifted with respect to each other so that transmission of the reduced data to the external apparatus 20 may be prioritized over transmission of the scanned image. However, in other examples, transmission of the reduced data may be prioritized over transmission of the scanned image by setting the priority of a packet of reduced data to be relatively higher, or by setting the priority of a packet of the scanned image to be relatively lower, for example.

As described above, according to the second embodiment, even when the scanned image has to be transmitted to the external apparatus 20, transmission of the reduced data to the external apparatus 20 that is necessary for making an "immediate and intelligent response" may be prioritized over transmission of the scanned image. In this way, influences of the time required for network communication associated with transmission of the scanned image on the ability to make an "immediate and intelligent response" may be reduced.

In the following, a third embodiment of the present invention will be described. Note that aspects and features of the third embodiment that differ from those of the first and/or second embodiment will be described below. Thus, it may be assumed that aspects and features of the third embodiment that are not particularly mentioned below may be substantially the same as those of the first and/or second embodiment.

In the third embodiment, processes executed by the extraction unit 23 and the determination unit 24 of the external apparatus 20 are different from those of the above-described embodiments.

In the data extraction process of step S105, the extraction unit 23 extracts (or determines) the document classification (document type) of the document to be transmitted. For example, in the case of the paper document d1 illustrated in FIG. 6, the extraction unit 23 extracts (or determines) that the document classification of the document to be transmitted is "invoice". The extraction of the document classification may be performed based on the size of the scanned document or may be performed by analyzing the content of the document, for example. Note that the document classification may be extracted (determined) using any known technique.

In the case where the first page of the paper document is a fax transmission form, the second page and any subsequent pages constitute the document to be transmitted. Thus, for example, in the binarization process of step S102, the data reduction unit 122 of the image forming apparatus 10 may generate reduced data of the second page of the scanned image or the second to N-th page of the scanned image (the maximum value of N being the number of pages included in the scanned image).

Also, in the determination process of step S106, the determination unit 24 determines a workflow set up for the invoice. That is, in the third embodiment, it is assumed that a workflow is set up for a document according to the document classification (document type) of the document to be transmitted by facsimile transmission. For example, with respect to an invoice, a workflow for saving a backup copy of the invoice on an in-house server may be set up. In this case, the determination result transmitting unit 25 transmits a determination result to the image forming apparatus 10 indicating that such a workflow is set up for the invoice.

Note that in the case of determining the workflow set up for a document according to the document classification of the document, the external apparatus 20 does not need the set fax number in executing the above determination process. As such, in the present embodiment, the data transfer unit 123 does not have to transmit the set fax number to the external apparatus 20 in step S103.

Based on the determination result received from the determination result transmitting unit 25, the confirmation unit 125 of the image forming apparatus 10 may output information for confirming with the user that a workflow for saving a backup copy of the invoice on the in-house server will be executed and whether the fax transmission should be executed, for example.

In the following, a fourth embodiment of the present invention will be described. Note that aspects and features of the fourth embodiment that differ from those of the third embodiment will be described below. Thus, it may be assumed that aspects and features of the fourth embodiment that are not particularly mentioned below may be substantially the same as those of the third embodiment.

In the fourth embodiment, the determination process executed by the determination unit 24 of the external apparatus 20 differs from the determination process executed in the third embodiment.

In the determination process of step S106 according to the present embodiment, the determination unit 24 determines whether a receipt corresponding to the invoice has been received. That is, as a prerequisite to transmitting the invoice, the determination unit 24 determines whether a document that should have been received from the destination of the invoice has in fact been received. The receipt corresponding to the invoice may be a receipt including the same number as the number described in the invoice (e.g., "No. 1234-56" in FIG. 6). It is assumed that the information processing system 1 is configured such that when such a receipt is received, the receipt is registered in a predetermined database. Thus, the determination unit 24 can determine whether a receipt corresponding to the invoice has been received by searching the predetermined database based on the number described in the invoice. The determination result transmitting unit 25 transmits a determination result to the image forming apparatus 10 indicating whether the receipt has been received.

Based on the determination result received from the determination result transmitting unit 25, the confirmation unit 125 of the image forming apparatus 10 may output information for confirming with the user whether fax transmission should be executed even though a receipt corresponding to the invoice to be transmitted has not been received, for example. In this way, execution of work that is not suitable for a workflow may be avoided, for example.

The following examples (1) to (4) are some other example embodiments of the present invention.

(1) The determination unit 24 determines whether a character string registered in advance as a keyword for identifying a document that the user should not transmit is included in a character string extracted from the reduced data. In the case where the corresponding character string is included in the reduced data, the confirmation unit 125 outputs information for prompting the user to cancel transmission before fax transmission is executed. For example, keywords suggesting that information unrelated to work is included and/or keywords related to confidential information of a company may be registered in advance as keywords for identifying a document that should not be transmitted.

(2) The determination unit 24 compares the reduced data with data (reduced data thereof) that has been previously transmitted. Note that the scan settings for the respective sets of reduced data may also be compared, for example. In this case, the scan settings may be transmitted together with the reduced data to the external apparatus 20. Further, a character string extracted from the current reduced data and a character string extracted from the reduced data of the previously transmitted data may also be compared to determine whether they are different. In this way, the document to be transmitted may be checked for typographical errors, for example.

(3) The determination unit 24 also may make a determination relating to the image quality of the scanned image or the reduced data. When it is determined that the image quality is worse than a predetermined image quality level, the confirmation unit 125 may output a message prompting the user to change the scanning condition or output information on a scanning condition suitable for character recognition or the document, for example.

(4) The determination unit 24 performs prior confirmation for form recognition. For example, determinations may be made for appropriately recognizing a form. Specifically, for example, the storage location of form information may be confirmed, and OCR acceleration features (zonal OCR areas) for form recognition may be confirmed such that processing speed may be increased the next time form recognition is performed.

Note that in the above-described embodiments, an example case where the document to be transmitted by fax transmission is a paper document is described. However, in some embodiments, an electronic document that is not output in the form of paper may be selected or designated as a document to be transmitted by fax transmission. For example, each of the above-described embodiments may be applied to a case where an electronic document created by a PC (Personal Computer) or the like is transmitted by fax transmission. In this case, the PC may have the same functional configuration as that of the image forming apparatus 10 as illustrated in FIG. 4 or FIG. 9, for example. Note, however, that the PC does not need to include the image input unit 121.

Also, in the above-described embodiments, an example case where fax transmission corresponds to the process to be executed with respect to the image data is described. However, each of the above-described embodiments may also be applied to a case where a process other than fax transmission is to be executed with respect to the image data.

Also, in some embodiments, a device, such as a projector, a video conference system, or a digital whiteboard, may be used in place of the image forming apparatus 10.

Note that the image forming apparatus 10 of the above-described embodiments is an example of a device. The external apparatus 20 is an example of an information processing apparatus. The scanned image is an example first image data. The reduced data is an example of second image data.

Also, note that a person skilled in the field of information processing technology may implement the present invention using an application specific integrated circuit (ASIC) or an apparatus in which circuit modules are connected.

Further, each of the functions (units) described in connection with the above embodiments may be implemented by one or more circuits.

The one or more circuits described above may include a processor programmed by software to execute a corresponding function, and/or hardware, such as an ASIC or a circuit module, designed to execute the corresponding function, for example.

Although the present invention has been described above with reference to certain illustrative embodiments, the present invention is not limited to these embodiments, and numerous variations and modifications may be made without departing from the scope of the present invention.

According to one aspect of the present invention, a device is provided that includes a memory storing a program and a processor configured to execute the program to implement processes of generating second image data that has a reduced amount of data as compared with first image data on which a process is to be executed, transmitting the generated second image data to an information processing apparatus that is connected to the device via a network, receiving a determination result indicating whether the second image data satisfies a predetermined condition from the information processing apparatus, and outputting information based on the received determination result.

According to another aspect of the present invention, an information processing apparatus that is connected to the above device via a network is provided. The information processing apparatus includes a memory storing a program and a processor configured to execute the program to implement processes of receiving the second image data from the device, determining whether the second image data satisfies the predetermined condition before the process is executed on the first image data, and transmitting the determination result to the device.

According to another aspect of the present invention, an information processing method implemented by a device is provided that includes steps of generating second image data that has a reduced amount of data as compared with first image data on which a process is to be executed, transmitting the generated second image data to an information processing apparatus that is connected to the device via a network, receiving a determination result indicating whether the second image data satisfies a predetermined condition from the information processing apparatus, and outputting information based on the received determination result.

According to another aspect of the present invention, an information processing method implemented by an information processing apparatus that is connected to the above device via a network is provided. The information processing method includes steps of receiving the second image data from the device, determining whether the second image data satisfies the predetermined condition before the process is executed on the first image data, and transmitting the determination result to the device.

What is claimed is:

1. An image forming apparatus comprising:
a memory storing a program; and
a processor configured to execute the program to implement processes of
generating second image data from first image data on which a process is to be executed, the second image data having a reduced amount of data as compared with the first image data;
transmitting the generated second image data and a character string that is set up with respect to the process to be executed to an information processing apparatus that is connected to the image forming apparatus via a network;
receiving from the information processing apparatus, a determination result indicating whether the second image data satisfies a predetermined condition and whether the character string is included in the second image data; and
outputting information based on the received determination result, wherein
the first image data is image data of a plurality of pages; and
the processor generates the second image data for a page of the first image data that is expected to include the character string.

2. The image forming apparatus according to claim 1, wherein
the processor transmits the second image data and the first image data to the information processing apparatus by prioritizing transmission of the second image data over transmission of the first image data; and
the information processing apparatus executes the process on the first image data.

3. The image forming apparatus according to claim 1, wherein
the processor transmits to the information processing apparatus, the second image data and an info illation item set up with respect to the process to be executed; and
the processor receives from the information processing apparatus, the determination result that indicates whether the second image data is in conformity with the information item.

4. The image forming apparatus according to claim 1, wherein the character string indicates a transmission destination for the first image data or data that is generated based on the first image data.

5. An information processing system comprising:
an image forming apparatus; and
an information processing apparatus that is connected to the image forming apparatus via a network;
wherein the image forming apparatus includes a first memory storing a first program and a first processor configured to execute the first program to implement processes of
generating second image data from first image data on which a process is to be executed, the second image data having a reduced amount of data as compared with the first image data;
transmitting the generated second image data and a character string that is set up with respect to the process to be executed to the information processing apparatus;
receiving from the information processing apparatus, a determination result indicating whether the second image data satisfies a predetermined condition and whether the character string is included in the second image data; and
outputting information based on the received determination result, wherein
the first image data is image data of a plurality of pages, and
the processor generates the second image data for a page of the first image data that is expected to include the character string; and
wherein the information processing apparatus includes a second memory storing a second program and a second processor configured to execute the second program to implement processes of
receiving the second image data from the image forming apparatus;
determining whether the second image data satisfies the predetermined condition before the process is executed on the first image data; and transmitting the determination result to the image forming apparatus.

6. The information processing system according to claim 5, wherein
the image forming apparatus transmits the second image data and the first image data to the information processing apparatus by prioritizing transmission of the second image data over transmission of the first image data; and
the information processing apparatus executes the process on the first image data.

7. The information processing system according to claim 5, wherein
the image forming apparatus transmits to the information processing apparatus, the second image data and an information item set up with respect to the process to be executed; and
the image forming apparatus receives from the information processing apparatus, the determination result that indicates whether the second image data is in conformity with the information item.

8. The information processing system according to claim 5, wherein the character string indicates a transmission destination for the first image data or data that is generated based on the first image data.

9. An information processing method implemented by an image forming apparatus, the information processing method comprising steps of:
generating second image data from first image data on which a process is to be executed, the second image data having a reduced amount of data as compared with the first image data;
transmitting the generated second image data and a character string that is set up with respect to the process to be executed to an information processing apparatus that is connected to the device via a network;
receiving from the information processing apparatus, a determination result indicating whether the second image data satisfies a predetermined condition; and
outputting information based on the received determination result, wherein
the first image data is image data of a plurality of pages; and
the processor generates the second image data for a page of the first image data that is expected to include the character string.

10. The information processing method according to claim 9, wherein
the image forming apparatus transmits the second image data and the first image data to the information processing apparatus by prioritizing transmission of the second image data over transmission of the first image data; and
the information processing apparatus executes the process on the first image data.

11. The information processing method according to claim 9, wherein
the image forming apparatus transmits to the information processing apparatus, the second image data and an information item set up with respect to the process to be executed; and
the image forming apparatus receives from the information processing apparatus, the determination result that indicates whether the second image data is in conformity with the information item.

12. The information processing method according to claim 9, wherein the character string indicates a transmission destination for the first image data or data that is generated based on the first image data.

* * * * *